United States Patent Office 3,008,924
Patented Nov. 14, 1961

---

3,008,924
N-(HETEROCYCLIC ALKYL)-AMINOALKYL SILICON COMPOUNDS AND PROCESS FOR THEIR PREPARATION
Robert J. Lisanke, Buffalo, N.Y., assignor to Union Carbide Corporation, a corporation of New York
No Drawing. Filed June 27, 1958, Ser. No. 744,937
12 Claims. (Cl. 260—46.5)

This invention relates in general to novel organosilicon compounds and to a process for producing them. More particularly, the invention relates to organosilicon compounds containing an N-(heterocyclic substituted alkyl)-aminoalkylsilyl grouping wherein the amino group is interconnected to the silicon atom of the silyl grouping through at least three carbon atoms and the amino group is also substituted by a heterocyclic substituted alkyl group, as new compositions of matter and to a process for producing them.

The compositions of the instant invention are organosilicon compounds which contain at least one silicon atom and an N-(heterocyclic substituted alkyl)aminoalkylsilyl grouping as represented by the formula:

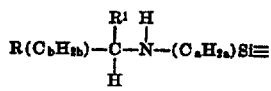

wherein R' is a monovalent hydrocarbon radical free of aliphatic unsaturation or a hydrogen atom; $a$ is an integer having a value of at least 3 and preferably from 3 to 19, $b$ is an integer of from 0 to 3, and R is a mono-valent heterocyclic group containing no hetreocyclic ring of less than 5 atoms and composed of carbon, hydrogen, one sulfur atom and from 0 to 1 nitrogen atom, said heterocyclic group containing no other heterocyclic atoms than sulfur and nitrogen, each silicon atom of the organosilicon compound is bonded to from 1 to 3 oxygen atoms, each silicon bonded oxygen atom is bonded to either a silicon atom or a carbon atom of an alkyl group and each remaining unfilled valence of all silicon atoms is satisfied by no other group than a hydrogen atom or a monovalent hydrocarbon radicals. Such heterocyclic groups include those containing one sulfur atom in the ring, e.g. thienyl, thiapyranyl, benzothienyl and the like; those containing one sulfur atom and one nitrogen atom in the ring, e.g. phenothiazinyl, thiazyl, isothiazyl, benzothiazyl and the like. Such heterocyclic groups also include those that contain a single heterocyclic ring such as thienyl, thiapyranyl, thiazyl and the like as well as those containing fused rings such as, for example, benzothienyl, phenothiazinyl, benzothiazyl and the like.

Compositions of this invention which are monomeric are the organosilanes represented by the formula:

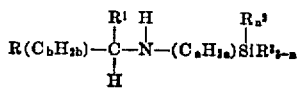

wherein R, R¹, $a$ and $b$ have the above-defined meanings and R² represents a monovalent hydrocarbon radicals or a hydrogen atom, R³ represents an alkoxy group and $n$ is an integer of from 0 to 2. The organosilanes which are monofunctional in regard to the silicon atom (i.e. where $n=2$) are, for example, gamma-N-(thienylmethyl) aminopropyldiethylethoxysilane, gamma-N-(benzothienyl-methyl)-aminopropyldiphenylpropoxysilane and the like. Organosilanes which are difunctional in regard to the silicon atom (i.e., where $n=1$) are, for example, delta-N-(isothiazylmethyl)aminobutylmethyldiethoxysilane, gamma - N - (benzothienylmethyl)aminopropylphenyldimethoxysilane and the like. The organosilanes which are trifunctional in regard to the silicon atom (i.e. where $n=0$)

are, for example, delta-N-(phenothiazinylmethyl)amino-butyltriethoxysilane, delta - N-[thiazyl(methyl)methyl] aminobutyltributoxysilane, gamma-N-(thienylmethyl)trimethoxysilane and the like.

The compositions of this invention which are polymeric are the organosiloxanes as represented by the formula:

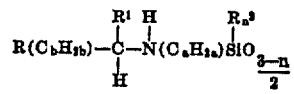

wherein R, R¹, R², $a$, $b$ and $n$ have the above-defined meanings. The organosiloxanes of this invention that are trifunctional in regard to the silicon atom (i.e. where $n=0$) including crosslinked organopolysiloxanes, for example, delta - N-(thienylmethyl)aminobutylpolysiloxane, gamma - N-(phenothiazinylmethyl)aminopropylpolysiloxane and the like. Organosiloxanes of this invention which are difunctional in regard to the silicon atom (i.e. where $n=1$) include the linear and cyclic organosiloxanes. Such linear organosiloxanes are those containing units of the formula:

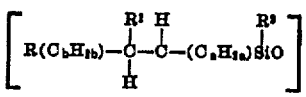

wherein R, R¹, R², $a$ and $b$ have the above defined meanings. These linear organosiloxanes are, for example, gamma - N - (thienylmethyl)aminopropylmethylpolysiloxane, delta - N - (benzothienylmethyl)aminobutyl-phenylpolysiloxane and the like. The organosiloxanes which are difunctional in regard to the silicon atom (i.e. where $n=1$) also include cyclic organosiloxanes of the formula:

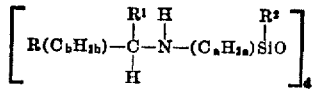

wherein R, R¹, R², $a$ and $b$ have the above-defined meanings and $d$ is an integer of from 3 to 7. These cyclic organosiloxanes are, for example, tetra gamma-N-(thiazyl-methyl)aminopropyltetraethylcyclotetrasiloxane, penta-delta-N-(thienylmethyl)aminobutylpenta-phenylcyclopen-tasiloxane, hepta-gamma-N-(thiapyranylmethyl)aminopropylhepta-ethylcycloheptasiloxane and the like. The compositions of this invention which are monofunctional in regard to the silicon atom (i.e. where $n=2$) are the dimeric siloxanes, for example: bis-gamma-N-(phenothiazinylmethyl)aminopropyldimethyldisiloxane, bis-delta-N-(thiazylmethyl)aminobutyldiphenyldisiloxane and the like.

Compositions of this invention which are copolymeric are those containing the units as represented by the formulae:

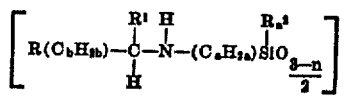

and

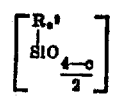

wherein R, R¹, R², $a$, $b$ and $n$ have the above-defined meanings and $c$ is an integer having a value of from 0 to 3, $c$ need not have the same value throughout the same molecule and $n$ need not have the same value throughout the same molecule and R² can represent the same or different groups within the same molecule. The copolymeric organosiloxanes of this invention include end-blocked linear copolymeric organosiloxane oils, copolymeric cyclics and copolymeric, resinous organosiloxanes containing the same or different substituted mono-, di- and trifunctional silicon atoms or the compositions of this invention can exist as copolymeric difunctional organosiloxane gums. Such copolymeric organosiloxane oils are those having the formula:

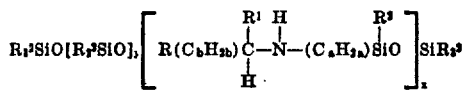

wherein R, $R^1$, $R^2$, $a$ and $b$ have the above-defined meanings, $y$ is an integer, $x$ is an integer of at least 1 and $R^2$ represents the same or different groups in the same molecule within its meaning as defined above. Such copolymeric organosiloxane oils are, for example: trimethylsiloxy end-blocked dimethylsiloxane-gamma-N-(thienylmethyl)aminopropylphenylsiloxane oil, triphenylsiloxy end-blocked diphenylsiloxane-delta-N-(benzothienyl methyl)aminobutylmethyl siloxane oils, tributylsiloxy end-blocked phenylmethylsiloxane omega-N-(thienylmethyl)-aminodecylmethylsiloxane oil and the like. Such copolymeric cyclic organosiloxanes are, for example: gamma-N - (thienylethyl)aminopropylheptamethylcyclotetrasiloxane, delta-N-(benzothiazylmethyl)aminobutylpentaphenylcyclotrisiloxane, gamma-N-(thienyl(ethyl)methyl)aminopropyl nona-methylcyclopentasiloxane and the like. Such copolymeric resinous compositions are, for example:

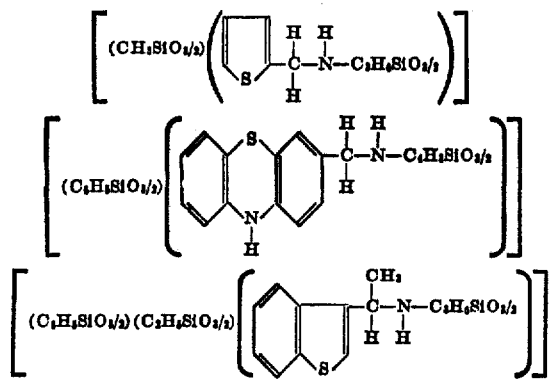

and the like.

The compositions of this invention are prepared by the reduction of organosilicon compounds containing a N-(heterocyclic substituted alkylidene)aminoalkylsilyl grouping, hereinafter called N-(heterocyclic substituted alkylidene)aminoalkylsilicon compounds by hydrogen in the presence of a hydrogenation catalyst according to the following general procedure:

The N-(heterocyclic substituted alkylidene)aminoalkylsilicon compound is charged into a stainless steel autoclave along with a hydrogenation catalyst and the autoclave pressurized with hydrogen gas. The autoclave is then agitated and heated to a temperature sufficiently elevated to cause the hydrogen and the N-(heterocyclic substituted alkylidene)-aminoalkylsilicon compound to react thereby producing the N-(heterocyclic alkyl)-aminoalkylsilicon compounds of this invention.

In carrying out the hydrogenation according to my invention, any of the well-known hydrogenation catalysts may be employed. I prefer to use such active hydrogenation catalysts as Raney nickel, bis(cyclopentadienyl) nickel, Raney cobalt, platinum-on-charcoal and palladium-on-asbestos. The amount of catalyst employed is not narrowly critical and from about 0.5 percent to about 10 percent by weight of the starting N-(heterocyclic substituted alkylidene)aminoalkylsilicon compound is preferred. No commensurate advantage is obtained using higher or lower amounts of the catalyst.

The temperature at which the process of this invention is carried out is not critical. Temperatures as low as 25° C. and as high as 250° C. are useful; however, temperatures of between 50° C. and 150° C. are preferred. Higher or lower temperatures can be used within the scope of this invention, but no commensurate advantage is gained thereby.

The pressure at which the process of this invention is carried out is not narrowly critical. Pressures as high as 200 atmospheres (3000 p.s.i.) and as low as 1.5 atmospheres (20 p.s.i.) may be used; however, pressures in the range of from about 20 to 100 atmospheres (300 to 1500 p.s.i.) are preferred. There is no commensurate advantage gained in using pressures above 3000 p.s.i. or below 20 p.s.i.

I prefer to carry out the process of my invention under substantially anhydrous conditions. However, the presence of water is not objectionable, except when the starting materials contain alkoxy groups bonded to the silicon atom thereof. The presence of water is objectionable in the latter instance due to the tendency of the alkoxy groups to hydrolyze in admixture with water.

A solvent is not essential to the process of this invention. However, a solvent may be used to serve as a diluent for the reaction mixture. Such a solvent can be any of the well-known volatile organic solvents which are inert toward the reactants used and which are not effected by the conditions of the process. Such solvents are, for example, alcohols, "Cellosolve" (2-alkoxyethanol) and "Carbitols" (diethylene glycol monoalkyl ethers).

The starting materials useful in the production of the compositions of this invention are the $N^2$(heterocyclic substituted alkylidene)aminoalkylsilicon compounds which contain units of the formula:

wherein R, $R^1$, $a$ and $b$ have the above-defined meanings and the valences of silicon are satisfied in the manner described above. Thus, for example, these starting materials are monomeric, polymeric and copolymeric.

The monomeric starting materials useful in preparing the compositions of this invention are the N-(heterocyclic substituted alkylidene)aminoalkylsilanes depicted by the formula:

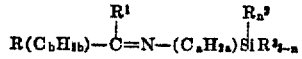

wherein R, $R^1$, $R^2$, $R^3$, $a$, $b$ and $n$ have the above-defined meanings. Such monomeric starting materials where $n=2$ are, for example, gamma-N-(benzothienylethylidene)aminopropyldiethylethoxysilane, gamma - N-(thiazylmethylidene)aminopropyldiphenylpropoxysilane and the like. Monomeric starting materials where $n=1$ are, for example, delta-N-(thienylpropylidene)aminobutylmethyldiethoxysilane, gamma-N-[benzothiazyl(methyl)methylidene]aminopropylphenyldiethoxysilane and the like. Monomeric starting materials where $n=0$ are, for example, delta - N - (thiapyranylmethylidene)aminobutyltriethoxysilane, delta - N - [phenothiazinyl(methyl)methylidene]aminobutyltributoxysilane, gamma - N - (benzothienylpropylidene)trimethoxysilane and the like.

The polymeric starting materials useful in preparing the composition of this invention are the N-(heterocyclic substituted alkylidene)aminoalkylsiloxanes depicted by the formula:

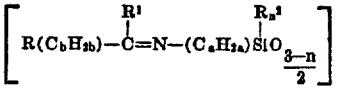

where R, $R^1$, $R^2$, $a$, $b$, and $n$ have the above-defined meanings. These polymeric starting materials include cyclic siloxanes as well as linear siloxane as, for example where $n=1$, the starting materials are in the cyclic form having from 3 to 7 such units or they are in linear form having a number of such groupings. Illustrative of the cyclic starting materials are, for example, tetra-[gamma - N - (benzothienylmethylidene)aminopropyl]

tetramethylcyclotetrasiloxane, tetra - [delta-N-(thienyl-ethylidene)amino]butyltetraphenylcyclotetrasiloxane and the like. Illustrative of the linear N-(heterocyclic substituted alkylidene)aminoalkylsiloxane are gamma-N - (thiapyranylmethylidene)aminopropylmethylpolysiloxane, delta - N - (thiazylmethylidene)aminobutylphenylpolysiloxane and the like. Where $n$ is 0 in the above formula, the N-(heterocyclic substituted alkylidene)aminoalkylsiloxanes are trifunctional in regard to the silicon atom, such as, for example, gamma-N-(phenothiazinylethylidene)aminopropylpolysiloxane, delta - N-(isothiazylmethylidene)aminobutylpolysiloxane and the like. These polymeric starting materials also include the lineral dimeric siloxanes, for example, bis-gamma-N - (thiapyranylmethylidene)aminopropyldimethyldisiloxane, bis-delta - N - (benzothienylmethylidene)aminobutyldiphenyldisiloxane and the like. These polymeric starting materials can be prepared by the hydrolysis and condensation of the corresponding alkoxysilanes.

The copolymeric N-(heterocyclic substituted alkylidene)aminoalkylsilicon compounds that are useful in preparing the compositions of this invention are those copolymeric organosiloxanes containing the units:

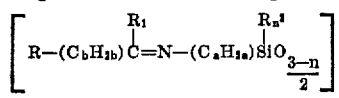

and

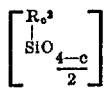

where R, $R^1$, $R^2$, $a$, $b$, $c$ and $n$ have the above-defined meanings. $R^2$ can be the same or different groups within its meaning as defined above and $c$ and $n$ can have different values within their meanings as described above. These copolymeric organosiloxanes can contain various combined siloxane units, such as, trifunctional N-(heterocyclic substituted alkylidene)aminoalkylsiloxane units (where $n=0$) with difunctional hydrocarbonsiloxane units (where $c=2$). These copolymeric organosiloxanes also include those containing other combinations of these units, such as difunctional N-(heterocyclic substituted alkylidene)aminoalkylsiloxane units (where $n=1$) with trifunctional hydrocarbonsiloxane units (where $c=1$) and difunctional hydrocarbonsiloxane units where ($c=2$) or any combination of these hydrocarbonsiloxane units so long as they contain at least one N-(heterocyclic substituted alkylidene)aminoalkylsiloxane units of any type, that is, mono-, di- or trifunctional. These copolymeric N-(heterocyclic substituted alkylidene)aminoalkylsilicon compounds can be prepared by the cohydrolysis and cocondensation of the corresponding alkoxysilanes. Such copolymeric organosiloxanes can contain residual silicon bonded alkoxy groups, or they can comprise essentially completely condensed materials.

The organosilanes in this invention can also be reacted with a Grignard reagent to substitute a silicon-bonded alkoxy group by a silicon-bonded monovalent hydrocarbon radicals according to methods known to those skilled in the art.

The polymeric organosiloxanes of this invention can also be prepared by the hydrolysis and condensation of the organosilanes of this invention.

The copolymeric compositions of this invention can also be prepared by the cohydrolysis and co-condensation of the monomeric organosilanes of this invention with hydrocarbonalkoxysilanes.

The N-(heterocyclic substituted alkylidene)aminoalkylsilicon compounds useful as starting materials in the production of the compositions of this invention are prepared by the reaction of a heterocyclic substituted aldehyde or ketone with an aminoalkylsilicon compound. These N-(heterocyclic substituted alkylidene)aminoalkylsilicon compounds are all disclosed and claimed as new compositions of matter in U.S. application Serial No. 744,900, filed concurrently herewith, as well as a process for producing the same.

The compositions of this invention can be mixed with the diglycidyl ether of 2,2-bis(para-hydroxyphenyl)propane and the mixture applied to ceramic and cementitious articles and cured thereon to provide wear and stain resistance. The compositions of this invention also find use as anti-oxidants, emulsion stabilizers, ultra-violet absorbing materials and as additives for known silicon products.

Example I

Gamma - N-[(2-methyl-5-thienyl)methylidene]aminopropylmethyldiethoxysilane and platinum-on-charcoal (1.5 g.) were charged into a 300 ml. stainless steel pressure vessel, the vessel sealed and pressured to 300 p.s.i. with hydrogen. The vessel was heated to 50° C. for 18 hours with rocking.

After the reaction mixture had been filtered and dried, there was obtained methyl-N-[(2-methyl-5-thienyl)methyl]aminopropylmethyldiethoxysilane

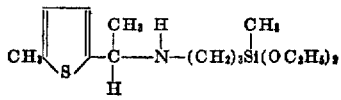

(B.P. 158–163 at 0.5 mm., $n_D^{25}=1.5060$).

Example II

Omega - N-(thiazoylmethylidene)aminoundecyltriethoxysilane can be reduced with hydrogen using a hydrogenation catalyst according to the procedure given in the previous examples to yield omega-N-(4-thiazylmethyl)aminoundecyltriethoxysilane.

Example III

A trimethylsiloxy end-blocked dimethylsiloxane oil containing combined gamma-N-[2-benzothiazyl(methyl)methylidene]aminopropylmethylsiloxy units can be reduced with hydrogen using a hydrogenation catalyst according to the procedure given in the previous examples to yield a trimethylsiloxy end-blocked dimethylsiloxane oil containing combined gamma-N-[2-benzothiazyl(methyl)methyl]aminopropylmethylsiloxy units.

Example V

Gamma - N - (4 - thiazylmethylidene)aminopropyldimethylethoxysilane can be reduced with hydrogen using a hydrogenation catalyst according to the procedure given in the previous examples to yield gamma-N-(4-thiazylmethyl)aminopropyldimethylethoxysilane.

Example VI

Delta - N - (2 - benzothiazylmethylidene)aminobutylphenyldibutoxysilane can be reduced with hydrogen using a hydrogenation catalyst according to the procedure given in the previous examples to yield delta-N-(benzothiazylmethyl)aminobutylphenyldibutoxysilane.

Example VII

Gamma - N - (3 - benzothienylmethylidene)aminopropylmethyldiethoxysilane can be reduced with hydrogen using a hydrogenation catalyst according to the procedure given in the previous examples to yield gamma-N-(3-benzothienylmethyl)aminopropylmethyldiethoxysilane.

Example VIII

Gamma - N - [4 - isothiazyl(methyl)methylidene]aminopropylpentamethylcyclotrisiloxane can be reduced with hydrogen using a hydrogenation catalyst according to the procedure given in the previous examples to yield gamma-N - [4-isothiazyl(methyl)methyl]aminopropylpentamethylcyclotrisiloxane.

Example IX

Delta - N - (3 - thiapyranylmethylidene)aminobutylnonamethylcyclopentasiloxane can be reduced with hydrogen using a hydrogenation catalyst according to the procedure given in the previous examples to yield delta-N - (3 - thiapyranylmethyl)aminobutylnonamethylcyclopentasiloxane.

Example X

A phenylmethylsilicone oil containing combined gamma - N - [3 - benzothienyl(methyl)methylidene]aminopropylmethylsiloxy units can be reduced with hydrogen using a hydrogenation catalyst according to the procedure given in the previous examples to yield a phenylmethylsilicone oil containing combined gamma-N-[3-benzothienyl(methyl)methyl]aminopropylmethylsiloxy units.

What is claimed is:

1. An organosilicon compound containing units of the formula:

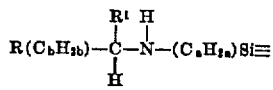

wherein R is a monovalent heterocyclic group selected from the group consisting of thienyl, thiapyranyl, benzothienyl, phenothiazinyl, thiazyl, isothiazyl and benzothiazyl radicals, $R^1$ is a member of the group consisting of the hydrogen atom and monovalent hydrocarbon radicals free of aliphatic unsaturation, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, each silicon atom of the organosilicon compound being bonded to from 1 to 3 oxygen atoms, said silicon bonded oxygen atoms being bonded to no other atoms than a silicon atom and a carbon atom of an alkyl group and each remaining unfilled valence of all silicon atoms being satisfied by no other groups than hydrogen and monovalent hydrocarbon radicals.

2. An organosilane of the formula:

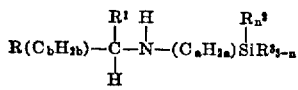

wherein R is a monovalent heterocyclic group selected from the group consisting of thienyl, thiapyranyl, benzothienyl, phenothiazinyl, thiazyl, isothiazyl and benzothiazyl radicals, $R^1$ is a member of the group consisting of the hydrogen atom and monovalent hydrocarbon radicals free of aliphatic unsaturation, $R^2$ is a member of the group consisting of the hydrogen atom and monovalent hydrocarbon radicals, $R^3$ is an alkoxy group, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, and $n$ is an integer of from 0 to 2.

3. An organosiloxane containing units of the formula:

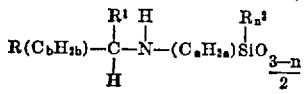

wherein R is a monovalent heterocyclic group selected from the group consisting of thienyl, thiapyranyl, benzothienyl, phenothiazinyl, thiazyl, isothiazyl and benzothiazyl radicals, $R^1$ is a member of the group consisting of the hydrogen atom and monovalent hydrocarbon radicals free of aliphatic unsaturation, $R^2$ is a member of the group consisting of the hydrogen atom and monovalent hydrocarbon radicals, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, and $n$ is an integer of from 0 to 2.

4. A cyclic organosiloxane of the formula:

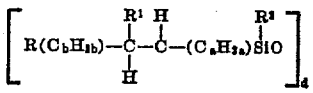

wherein R is a monovalent heterocyclic group selected from the group consisting of thienyl, thiapyranyl, benzothienyl, phenothiazinyl, thiazyl, isothiazyl and benzothiazyl radicals, $R^1$ is a member of the group consisting of the hydrogen atom and monovalent hydrocarbon radicals free of aliphatic unsaturation, $R^2$ is a member of the group consisting of the hydrogen atom and monovalent hydrocarbon radicals, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, and $d$ is an integer of from 3 to 7.

5. A linear organosiloxane containing the unit formula:

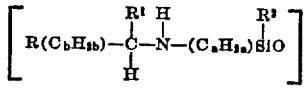

wherein R is a monovalent heterocyclic group selected from the group consisting of thienyl, thiapyranyl, benzothienyl, phenothiazinyl, thiazyl, isothiazyl and benzothiazyl radicals, $R^1$ is a member of the group consisting of the hydrogen atom and monovalent hydrocarbon radicals free of aliphatic unsaturation, $R^2$ is a member of the group consisting of the hydrogen atom and monovalent hydrocarbon radicals, $a$ is an integer of from 3 to 19, and $b$ is an integer of from 0 to 3, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond.

6. An organosilicon compound containing units of the formula:

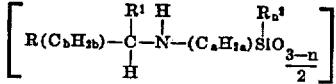

and

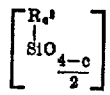

wherein R is a monovalent heterocyclic group selected from the group consisting of thienyl, thiapyranyl, benzothienyl, phenothiazinyl, thiazyl, isothiazyl and benzothiazyl radicals, $R^1$ is a member of the group consisting of the hydrogen atom and monovalent hydrocarbon radicals free of aliphatic unsaturation, $R^2$ is a member of the group consisting of the hydrogen atom and monovalent hydrocarbon radicals, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the ($C_bH_{2b}$) group through a carbon to carbon bond, $n$ is an integer of from 0 to 2 and $c$ is an integer of from 0 to 3.

7. Gamma - N - [(2-methyl-5-thienyl)(methyl)methyl]aminopropyl-triethoxysilane.

8. A process for producing N-(heterocyclic alkyl)aminoalkylsilicon compounds containing units of the formula:

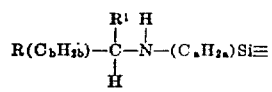

wherein R is a monovalent heterocyclic group selected from the group consisting of thienyl, thiapyranyl, benzothienyl, phenothiazinyl, thiazyl, isothiazyl and benzothiazyl radicals, $R^1$ is a member of the group consisting of the hydrogen atom and monovalent hydrocarbon radicals free of aliphatic unsaturation, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the ($C_bH_{2b}$) group through a carbon to carbon bond, each silicon atom of the organosilicon compound being bonded to from 1 to 3 oxygen atoms, said silicon bonded oxygen atoms being bonded to no other atoms than a silicon atom and a carbon atom of an alkyl group and each remaining unfilled valence of all silicon atoms being satisfied by no other groups than hydrogen and monovalent hydrocarbon radicals which comprises reacting an N-(heterocyclic substituted alkylidene)aminoalkylsilicon compound of the formula:

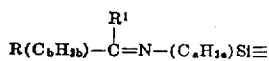

wherein R, $R^1$, $a$ and $b$ have the above-defined meanings, and the valences of silicon are satisfied as above, with hydrogen under pressure in the presence of a hydrogenation catalyst to produce said N-(heterocyclic alkyl)-aminoalkylsilicon compounds.

9. A process for producing N-(heterocyclic alkyl)aminoalkylsilicon compounds containing units of the formula:

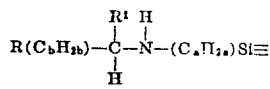

wherein R is a monovalent heterocyclic group selected from the group consisting of thienyl, thiapyranyl, benzothienyl, phenothiazinyl, thiazyl, isothiazyl and benzothiazyl radicals, $R^1$ is a member of the group consisting of the hydrogen atom and monovalent hydrocarbon radicals free of aliphatic unsaturation, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the ($C_bH_{2b}$) group through a carbon to carbon bond, each silicon atom of the organosilicon compound being bonded to from 1 to 3 oxygen atoms, said silicon bonded oxygen atoms being bonded to no other atoms than a silicon atom and a carbon atom of an alkyl group and each remaining unfilled valence of all silicon atoms being satisfied by no other groups than hydrogen and monovalent hydrocarbon radicals, which comprises reacting an N-(heterocyclic substituted alkylidene)aminoalkylsilicon compound of the formula:

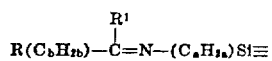

wherein R, $R^1$, $a$ and $b$ have the above-defined meanings, and the valences of silicon are satisfied as above, with hydrogen under pressure in the presence of a hydrogenation catalyst at a temperature from 25° C. to 250° C. to form said N-(heterocyclic alkyl)aminoalkylsilicon compound.

10. A process for producing N-(heterocyclic alkyl)aminoalkylsilicon compounds containing units of the formula.

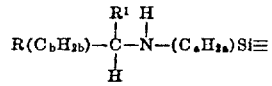

wherein R is a monovalent heterocyclic group selected from the group consisting of thienyl, thiapyranyl, benzothienyl, phenothiazinyl, thiazyl, isothiazyl and benzothiazyl radicals, $R^1$ is a member of the group consisting of the hydrogen atom and monovalent hydrocarbon radicals free of aliphatic unsaturation, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the ($C_bH_{2b}$) group through a carbon to carbon bond, each silicon atom of the organosilicon compound being bonded to from 1 to 3 oxygen atoms, said silicon bonded oxygen atoms being bonded to no other atoms than a silicon atom and a carbon atom of an alkyl group and each remaining unfilled valence of all silicon atoms being satisfied by no other groups than hydrogen and monovalent hydrocarbon radicals, which comprises reacting an N-(heterocyclic substituted alkylidene)aminoalkylsilicon compound of the formula:

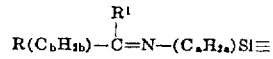

wherein R, $R^1$, $a$ and $b$ have the above-defined meanings and the valences of silicon are satisfied as above, with hydrogen under pressure in the presence of a hydrogenation catalyst at a temperature sufficiently elevated to cause said N-(heterocyclic substituted alkylidene)aminoalkylsilicon compound to react to produce said N-(heterocyclic alkyl)aminoalkylsilicon compound.

11. A process as claimed in claim 8 wherein the hydrogenation catalyst is selected from the group consisting of Raney nickel, bis-(cyclopentadienyl) nickel, Raney cobalt, platinum and palladium.

12. An organosiloxane of the formula:

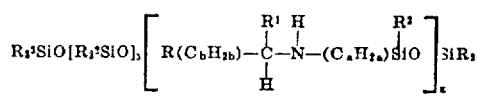

wherein R is a monovalent heterocyclic group selected from the group consisting of thienyl, thiapyranyl, benzothienyl, phenothiazinyl, thiazyl, isothiazyl and benzothiazyl radicals, $R^1$ is a member of the group consisting of the hydrogen atom and monovalent hydrocarbon radicals containing no aliphatic unsaturation, $R^2$ is a member of the group consisting of the hydrogen atom and monovalent hydrocarbon radicals, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, $y$ is an integer and $x$ is an integer of at least 1.

References Cited in the file of this patent

UNITED STATES PATENTS 2,762,823  Speier _____ Sept. 11, 1956

UNITED STATES PATENT OFFICE
CERTIFICATION OF CORRECTION

Patent No. 3,008,924            November 14, 1961

Robert J. Lisanke

It is hereby certified that error appears in the above numbered patent requiring correction and that the said Letters Patent should read as corrected below.

Column 2, lines 22 to 25, the formula should appear as shown below instead of as in the patent:

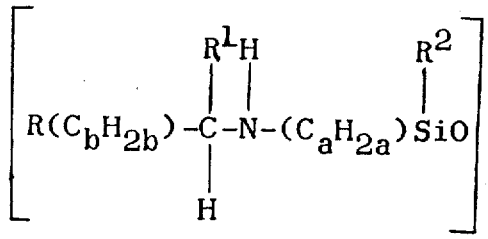

Column 8, lines 15 to 19, the formula should appear as shown below instead of as in the patent:

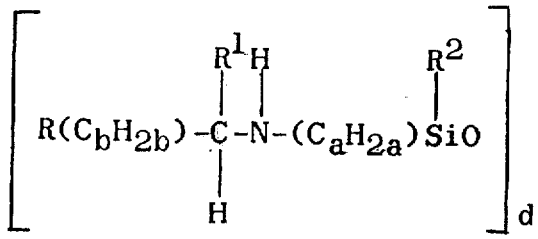

Signed and sealed this 24th day of April 1962.

(SEAL)
Attest:

ESTON G. JOHNSON
Attesting Officer

DAVID L. LADD
Commissioner of Patents